Figure 1:
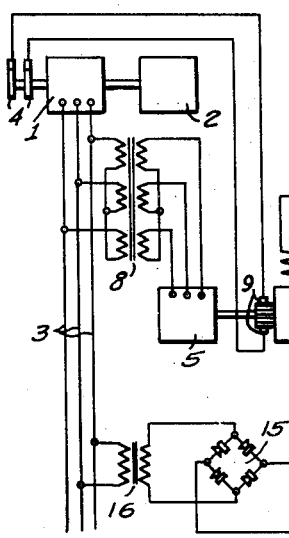

April 19, 1949.  C. LYNN  2,467,757

GENERATOR EXCITATION SYSTEM

Filed July 2, 1945

WITNESSES:

INVENTOR
Clarence Lynn
BY
O. B. Buchanan
ATTORNEY

Patented Apr. 19, 1949

2,467,757

UNITED STATES PATENT OFFICE 2,467,757

GENERATOR EXCITATION SYSTEM

Clarence Lynn, Forest Hills, Pa., assignor to Westinghouse Electric Corporation, East Pittsburgh, Pa., a corporation of Pennsylvania Application July 2, 1945, Serial No. 602,867

12 Claims. (Cl. 322—24)

The present invention relates to excitation systems for alternating-current generators, and more particularly to excitation systems of the type in which the direct-current exciter is driven by an alternating-current motor supplied from the output of the generator.

Synchronous alternating-current generators require a source of direct-current excitation, and this is usually supplied by a separate direct-current generator, or exciter. The exciter is often directly connected to the shaft of the alternating-current generator so as to be driven by the same prime mover. In many cases, however, it is not desired to drive the exciter in this manner, and excitation for the alternating-current generator is supplied by a motor-generator set consisting of an alternating-current motor, energized from the output of the generator, which drives the main exciter and, if desired, a pilot exciter for separately exciting the field of the main exciter. Such an excitation system has certain advantages, but it is subject to a serious difficulty in case of a drop in voltage of the main generator. Thus, if a disturbance occurs on the line to which the main generator is connected which results in a sudden drop in the generator voltage, the speed of the driving motor of the excitation motor-generator set decreases, resulting in a drop in the exciter voltage. This, in turn, causes a decrease in the excitation of the main generator, with a further reduction in its voltage, so that the condition is aggravated.

The principal object of the present invention is to provide an excitation system for an alternating-current generator, of the type which consists of an alternating-current motor driving an exciter, in which the field excitation of the exciter is controlled so as to maintain the exciter voltage unchanged, or to increase the exciter voltage, in case of a decrease in speed of the driving motor caused by a drop in the voltage of the main generator.

A more specific object of the invention is to provide an excitation system for an alternating-current generator, of the type in which an alternating-current motor drives an exciter, in which the field excitation of the exciter, or of a pilot exciter which separately excites the field of the main exciter, includes a self-excited component and a differential component which is derived from the output of the main generator, so that if the generator voltage drops the differential component decreases, and the resultant excitation increases sufficiently to maintain the voltage of the main exciter unchanged, or to cause it to rise, even though the self-excited component of the exciter excitation decreases somewhat because of the decrease in speed of the driving motor.

Figure 2:
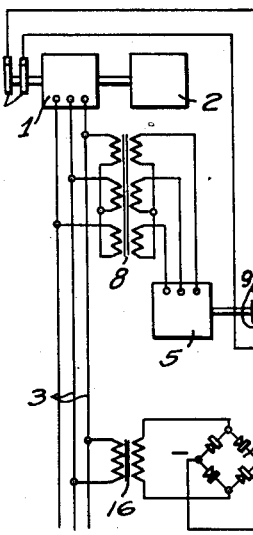
Figure 3:
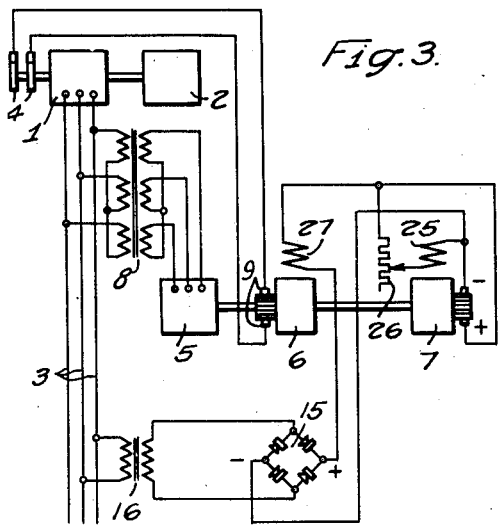
Figure 4:
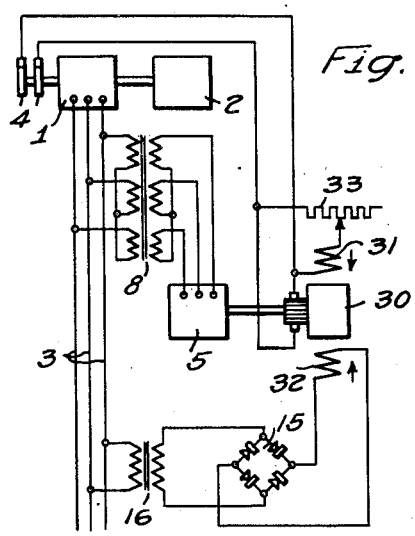

Other objects and advantages of the invention will be apparent from the following detailed description, taken in connection with the accompanying drawing, in which:

Figure 1 is a schematic diagram showing a preferred embodiment of the invention, and Figs. 2, 3 and 4 are similar diagrams showing various modified embodiments of the invention.

Fig. 1 shows the invention embodied in an excitation system for a three-phase alternating-current generator 1 driven by a steam turbine 2, or other suitable prime mover. The generator 1 is connected to supply a three-phase line 3, and slip rings 4 are mounted on the shaft of the generator for effecting connection to its field winding. The field winding of the generator 1 is excited by means of a motor-generator set which includes an alternating-current motor 5, a main exciter 6, and a pilot exciter 7. The driving motor 5 is an alternating-current motor which may be of any suitable type, such as a squirrel-cage induction motor, and the motor 5 is connected to the alternating-current line 3, either directly or through a three-phase transformer 8. The exciter 6, which is driven directly by the motor 5, as indicated, is a direct-current generator, which may be of any suitable construction, having a commutator engaged by brushes 9. The brushes 9 of the exciter 6 are connected directly to brushes riding on the slip rings 4 of the generator 1 to supply direct-current excitation to the field winding of the generator. The exciter 6 has a field winding 10 which is separately excited by the pilot exciter 7, the field winding 10 being connected directly to the brushes 12 of the pilot exciter.

The pilot exciter 7, which is also directly driven by the motor 5, is a direct-current generator of any suitable construction, and has a self-excited shunt field winding 11 connected across its brushes 12. A field rheostat 13 may be connected in series with the self-excited field winding 11 to adjust the voltage of the pilot exciter. The pilot exciter 7 also has a separately-excited, differential field winding 14 which produces a flux opposing the flux of the self-excited field winding 11. The differential field winding 14 is energized by a voltage which is proportional to the output voltage of the main generator 1. This voltage is preferably obtained by means of a rectifier 15, of any suitable type, connected across the alternating-current line 3, either directly or through a transformer 16, the differential winding 14 being connected across the direct-current output of the rectifier 15. The rectifier 15 has been shown as a single-phase rectifier, but it will be obvious that if desired, a three-phase rectifier might be used.

The flux of the separately-excited differential field winding 14 is made less than that of the self-excited field winding 11 of the pilot exciter, which may, for example, be accomplished by designing the transformer 16 and rectifier 15 so that the output voltage of the rectifier 15 is less than the normal voltage of the pilot exciter 7, across which the self-excited field 11 is connected. Thus, the effect of the differential field 14 is to reduce the resultant field excitation of the pilot exciter from what it would be if the self-excited field alone were used. In normal operation, the field rheostat 13 is adjusted so that the output voltage of the pilot exciter 7 has the proper value to supply sufficient field excitation to the main exciter 6 to cause its voltage to have the proper value to excite the field of the main generator 1 with the necessary exciting current to maintain the generator voltage at the desired value. If desired, a voltage regulator of any suitable type might be used to control the field winding 11 of the pilot exciter 7, although the present system will operate satisfactorily without a voltage regulator.

In case of a drop in voltage of the main generator 1, such as might be caused by a disturbance on the line 3, the speed of the motor 5 will decrease, thus tending to reduce the output voltages of both the pilot exciter 7 and the main exciter 6. The voltage applied to the differential field winding 14, however, also decreases proportionally to the decrease in voltage of the generator 1, thus reducing the differential effect of the field winding 14. The result of this is that the resultant field excitation of the pilot exciter 7 increases, because the decrease in the differential field is greater than the slight decrease in the self-excited field resulting from the drop in speed. The resultant field excitation, therefore, increases, and raises the voltage of the pilot exciter 7. This increases the field excitation of the main exciter 6, so that its voltage remains substantially unchanged in spite of the decrease in speed or, if desired, the system may be so designed as to cause the main exciter voltage to actually increase. The exciting current supplied to the field winding of the main generator 1, therefore, remains unchanged, or increases, thus tending to restore its voltage. When the generator voltage comes back up to its normal value, the excitation of the differential field winding 14 is increased, so that the resultant field excitation of the pilot exciter decreases, reducing the excitation of the main exciter 6 to compensate for the increase in speed of the driving motor 5 as the voltage comes up, and the system again reaches equilibrium when the generator voltage is restored to its normal value.

It will be apparent, therefore, that an excitation system has been provided of the type in which the excitation is supplied from a motor-generator set driven by an alternating-current motor energized from the output of the main generator, but in which a drop in generator voltage results in maintaining the exciter voltage unchanged, or in increasing it, so as to increase the generator excitation and thus tend to restore its voltage. The system thus acts to maintain the generator voltage at the desired value, since a change in either direction results in an opposite change in excitation, so that the voltage is brought back to its normal value.

It will be obvious that various modifications of this system are possible within the scope of the invention. Thus, as shown in Fig. 2, it is not necessary to have two separate field windings on the pilot exciter. In this figure, the pilot exciter 7 is shown as having a single field winding 20, which is connected in series with the output of the rectifier 15 across the brushes of the pilot exciter, the field rheostat 21, if used, also being in series with the winding 20. The rectifier 15 is connected to oppose the pilot exciter voltage, as indicated in the figure, and the effect of this arrangement is obviously exactly equivalent to that of Fig. 1, since the resultant current flowing in the field winding 20 is determined by the difference between the pilot exciter voltage and the output voltage of the rectifier 15. The resultant field excitation of the pilot exciter 7, therefore, increases upon a decrease in the main generator voltage in the same manner as described in connection with Fig. 1, and the operation of the system to maintain or increase the main exciter voltage is the same.

A further modification of the invention is shown in Fig. 3. In this figure, the main exciter 6 and pilot exciter 7 are driven by the alternating-current motor 5 in the same manner as described above. In this case, the pilot exciter 7 has only a self-excited shunt field winding 25 connected across the pilot exciter brushes in series with a field rheostat 26. The main exciter 6 has a field winding 27 which is connected in series with the rectifier 15 across the output voltage of the pilot exciter 7, the rectifier 15 being connected so that its voltage opposes the voltage of the pilot exciter. It will be seen that in this arrangement, the resultant current in the field winding 27 of the main exciter 6 will be determined by the difference between the pilot exciter voltage and the opposing voltage of the rectifier 15. Thus, if the voltage of the main generator 1 decreases, the output voltage of the rectifier 15 will decrease proportionally, and the excitation of the main generator 6 will be increased, so as to maintain its voltage in spite of the drop in speed of the motor 5 resulting from the decreased generator voltage, or to actually increase the exciter voltage. The operation of this system, therefore, is similar to that of the embodiments previously described, except that the differential voltage derived from the generator voltage is applied directly to the main exciter field instead of to the pilot exciter field.

The present invention is also applicable to systems in which no pilot exciter is used. Thus, in Fig. 4, the alternating-current motor 5 drives an exciter 30 which has a self-excited shunt field winding 31 and a differential, separately excited field winding 32. The self-excited winding 31 is connected directly across the brushes of the exciter 30 in series with a field rheostat 33. The separately excited, differential field winding 32 is connected to the output voltage of the rectifier 15, so that the differential excitation supplied by the winding 32 is proportional to the output voltage of the generator 1. It will be apparent that the operation of this embodiment of the invention is the same as that of Fig. 1, since a decrease in the generator voltage will result in a corresponding decrease in the excitation of the differential field winding 32, so that the resultant field excitation of the exciter 30 increases sufficiently to maintain its voltage, or to cause it to increase, in spite of the decrease in speed of the motor 5, thus maintaining the exciting current of the generator 1 high enough to tend to restore its voltage. It will also be apparent that instead of using two separate field windings, the rectifier 15 might be connected in series with the self-excited winding 31 in the manner shown in Fig. 2 for a pilot exciter.

Thus, an excitation system has been provided for alternating-current generators which is capable of various embodiments in each of which the excitation of the main exciter, or of the pilot excitor, includes two components, one of which is a self-excited component, which varies with the speed of the driving motor, and the other of which is a differential, separately excited component proportional to the generator voltage, the effect being that a drop in generator voltage causes a reduction in the differential component and thus a net increase in the resultant excitation, so as to maintain the exciter voltage unchanged, or to increase it, in spite of the drop in speed of the driving motor.

Various embodiments of the invention have been shown and described in order to illustrate the flexibility of the idea, but it will be apparent that various other embodiments are also possible, and it is to be understood, therefore, that the invention is not limited to the particular arrangements shown, but in its broadest aspects it includes all equivalent embodiments and modifications which come within the scope of the appended claims.

I claim as my invention:

1. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator in response to a voltage varying with the speed of said driving motor and an opposing voltage proportional to the voltage of the alternating-current generator.

2. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including means for providing a voltage varying with the speed of said driving motor, means for providing a voltage proportional to the voltage of the alternating-current generator, and means for exciting the direct-current generator in response to the difference of said voltages.

3. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including means for providing a component of excitation which varies with the speed of said driving motor, and means for providing a smaller, opposing component of excitation which is proportional to the voltage of the alternating-current generator, whereby the resultant excitation of the direct-current generator increases when the voltage of the alternating-current generator decreases.

4. An excitation system for an alternating-current generator, said excitation system including a direct-current generator for supplying exciting current to said alternating-current generator, an alternating-current induction motor energized from the alternating-current generator for driving said direct-curent generator, and means for providing field excitation for the direct-current generator, said excitation-providing means including a self-excited field winding, and a separately-excited differential field winding, and means for exciting said separately-excited field winding from the voltage of the alternating-current generator, whereby the resultant excitation derived from said two field windings increases when the voltage of the alternating-current generator decreases.

5. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including a self-excited field winding, and a separately-excited differential field winding, and rectifier means energized from the output of the alternating-current generator for exciting said separately-excited field winding proportionally to the voltage of the alternating-current generator, whereby the resultant excitation derived from said two field windings increases when the voltage of the alternating-current generator decreases.

6. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including a field winding and means for energizing said field winding in response to the difference between a voltage varying with the speed of said driving motor and a voltage proportional to the voltage of the alternating-current generator.

7. An excitation system for an alternating-current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including a field winding, means for providing a voltage varying with the speed of said driving motor, means for providing a voltage proportional to the voltage of the alternating-current generator, and means for connecting said field winding across said two voltages in series, said voltages being in opposition, whereby the field winding is energized in response to the difference of the two voltages.

8. An excitation system for an alternating current generator, said excitation system including a direct-current generator for supplying exciting current to said alternating-current generator, an alternating-current induction motor energized from the alternating-current generator for driving said direct-current generator, and means for providing field excitation for the direct-current generator, said excitation-providing means including a field winding, means for connecting said field winding across a voltage which varies with the speed of said driving motor, rectifier means energized from the output of the alternating-current generator, and means for connecting said rectifier means in series with the field winding and in opposition to the first-mentioned voltage.

9. An excitation system for an alternating-current generator, said excitation system including a direct-current generator for supplying exciting current to said alternating-current generator, an alternating-current induction motor energized from the alternating-current generator for driving said direct-current generator, said direct-current generator having a field winding, a second self-excited direct-current generator driven by said driving motor for supplying excitation to the first-mentioned direct-current generator, means for providing a voltage proportional to the voltage of the alternating-current generator, and means for connecting said voltage and the output of the second direct-current generator in opposition in series with the field winding of the first-mentioned direct current generator.

10. An excitation system for an alternating-current generator, said excitation system including a direct-current generator for suppyling exciting current to said alternating-current generator, an alternating-current induction motor energized from the alternating-current generator for driving said direct-current generator, said direct-current generator having a field winding, a second self-excited direct-current generator driven by said driving motor for supplying excitation to the first-mentioned direct-current generator, rectifier means energized from the output of the alternating-current generator, and means for connecting said rectifier means and the output of the second direct-current generator in opposition in series with the field winding of the first-mentioned direct-current generator.

11. An excitation system for an alternating-current generator, said excitation system including a direct-current generator for supplying exciting current to said alternating-current generator, an alternating-current induction motor energized from the alternating-current generator for driving said direct-current generator, said direct-current generator having a field winding, a second direct-current generator driven by said alternating-current motor and connected to supply exciting current to the field winding of the first-mentioned direct-current generator, said second direct-current generator having a self-excited shunt field winding and a separately-excited differential field winding, and means for varying the excitation of said separately-excited field winding proportionally to changes in the voltage of the alternating-current generator.

12. An excitation system for an alternating-current generator, said excitation system including a direct-current generator for supplying exciting current to said alternating-current generator, an alternating-current induction motor energized from the alternating-current generator for driving said direct-current generator, said direct-current generator having a field winding, a second direct-current generator driven by said alternating-current motor and connected to supply exciting current to the field winding of the first-mentioned direct-current generator, said second direct-current generator having a self-excited shunt field winding and a separately-excited differential field winding, rectifier means energized from the alternating-current generator, and means for energizing said separately-excited field winding from the output of said rectifier means.

CLARENCE LYNN.

REFERENCES CITED

The following references are of record in the file of this patent:

UNITED STATES PATENTS

| Number | Name | Date |
|---|---|---|
| 1,276,827 | Tanner | Aug. 27, 1918 |
| 1,874,716 | Stoller | Aug. 30, 1932 |
| 1,913,952 | Powell | June 13, 1933 |